Figure 1:
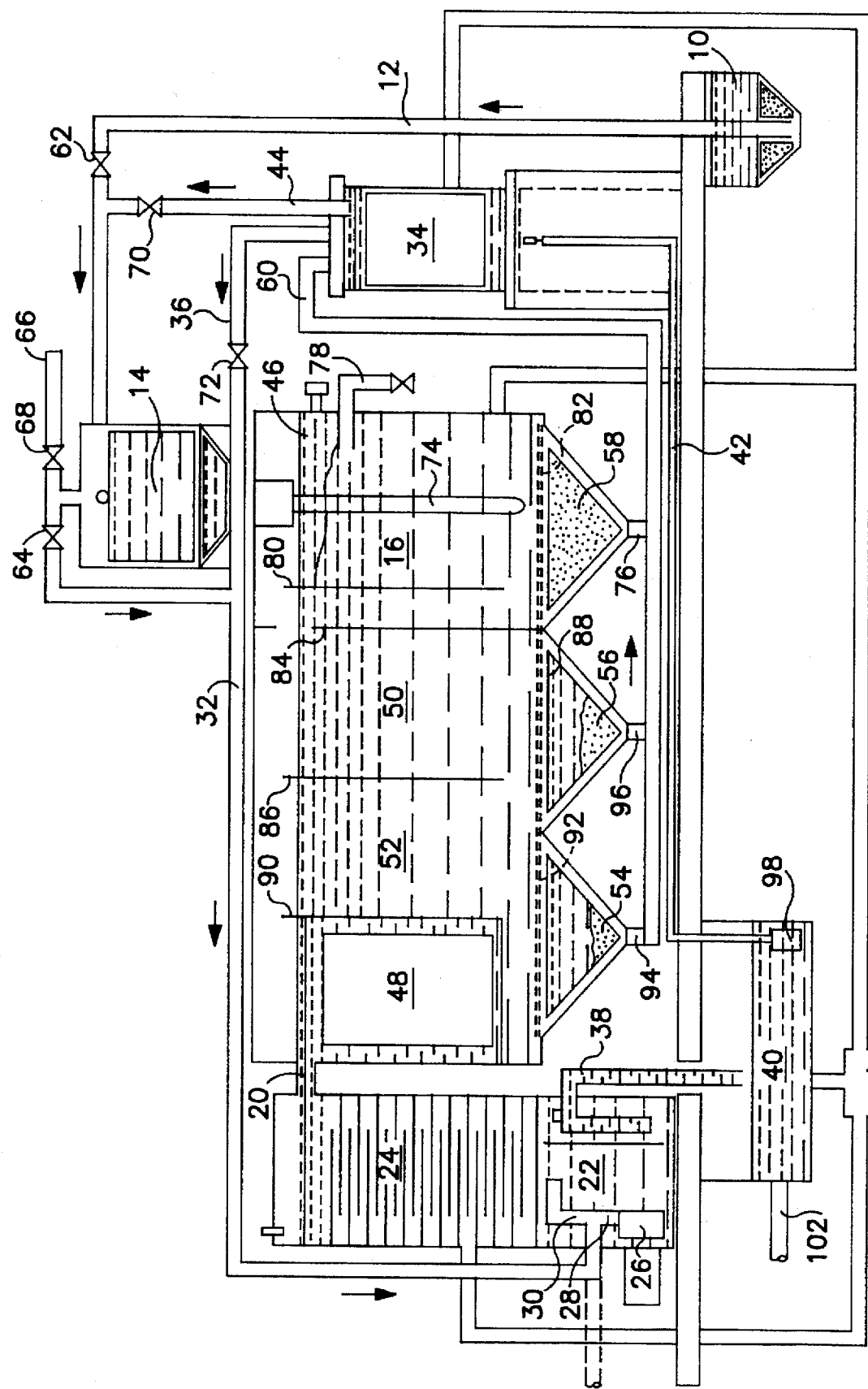

United States Patent [19]
Kloss et al.

[11] Patent Number: 5,665,245
[45] Date of Patent: Sep. 9, 1997

[54] PROCESS FOR RECIRCULATING AND PURIFYING WASTE WATER FROM A VEHICLE WASHING INSTALLATION

[75] Inventors: Harald Kloss, Bad-Vilbel; Erhard Crema, Maintal, both of Germany

[73] Assignee: BL Patentverwaltungs und Vertriebs GmbH, Germany

[21] Appl. No.: 360,674

[22] PCT Filed: Jul. 2, 1993

[86] PCT No.: PCT/EP93/01707

§ 371 Date: Apr. 11, 1995

§ 102(e) Date: Apr. 11, 1995

[87] PCT Pub. No.: WO94/01368

PCT Pub. Date: Jan. 20, 1994

[30] Foreign Application Priority Data

Jul. 3, 1992 [DE] Germany .............. 9208900 U
Sep. 23, 1992 [DE] Germany .............. 42 31 880.7
Mar. 8, 1993 [DE] Germany .............. 43 07 046.9

[51] Int. Cl.[6] .................................... B01D 17/12
[52] U.S. Cl. .................... 210/744; 134/111; 134/123; 210/805; 210/806; 417/151

[58] Field of Search .................... 210/97, 104, 167, 210/192, 257.1, 258, 259, 767, 744, 760, 764, 774, 805, 806; 417/46, 151, 182; 134/109–111, 423; 15/DIG. 2

[56] References Cited

U.S. PATENT DOCUMENTS

| 3,810,544 | 5/1974 | Armstrong et al. | 210/167 |
| 3,923,658 | 12/1975 | Lancaster | 210/167 |
| 4,104,164 | 8/1978 | Chelton | 210/167 |
| 4,652,368 | 3/1987 | Ennis et al. | 210/167 |
| 5,160,430 | 11/1992 | Gasser et al. | 210/167 |
| 5,160,605 | 11/1992 | Noestheden | 210/258 |

FOREIGN PATENT DOCUMENTS 0436090  7/1991  European Pat. Off. .
4040007  6/1992  Germany .

Primary Examiner—Joseph W. Drodge
Attorney, Agent, or Firm—Bierman, Muserlian & Lucas

[57] ABSTRACT

A process for purifying waste water form a vehicle washing installation and returning the purified water to the installation is described. The process circulates the collected waste water by negative pressure generated by a water jet pump. The pump has a water seal provided by a portion of the water after purifying.

13 Claims, 5 Drawing Sheets

PROCESS FOR RECIRCULATING AND PURIFYING WASTE WATER FROM A VEHICLE WASHING INSTALLATION

DESCRIPTION

The invention relates to a process and a system for purifying waste water, in particular waste water from motor vehicle washing installations.

In order to dispose of the waste water generated by motor vehicle washing installations and polluted by detergents and oil or other residues, this waste water is collected in sludge receiving tanks before being drained into a sewer via an oil separator. Analysis of the waste water drained off into the sewer has however shown that the degree of purification frequently fails to achieve the required standard. Furthermore, the water consumption is undesirably high, since the water used cannot generally be recycled.

From DE 40 40 007 A1, a self-service motor vehicle washing installation is known, in which the resulting waste water is purified both by mechanical equipment and by chemical substances such as a flocculant. The waste water to be purified then flows through quite bulky reservoirs, whereby the disadvantage arises, that bacterial cultures can occur, which lead to sludge production.

A process for purifying waste water from motor vehicle washing installations is known from EP 0 436 090 A1, in which purified water is mixed with purification-active substances such as flocculant and air.

The object underlying the present invention is to develop a system of the type described above or a process such that waste water purification to a sufficient extent is achieved without the need for the usual sludge receiving tanks on the one hand and for expensive sewage treatment systems on the other. In addition, a compact design and problem-free operation should be possible, permitting installation in existing washing installations too.

In accordance with the invention, the waste water to be purified is conveyed through the system by a water jet pump whose water seal is the purified or pre-purified waste water or the least pre-purified waste water.

The negative pressure generated by the water jet pump creates a vacuum which sucks the waster water collected in the first container, and that can come from a washing installation, into the third container, which in turn can be automatically emptied. To this end, the container can be closable at the bottom by a sealing element designed as a cover provided with a counterweight, said element opening automatically upon attaining a certain filling quantity or filling level due to the prevailing hydrostatic pressure, and after emptying—caused by the counterweight—automatically closing the container, with infiltrated air being sucked in during emptying. Consequently, it can be chosen as a construction which is described in DE 30 32 503 C2.

Intake of waste water can be controlled so that the sucked in water is first stabilized, for example, for two minutes, before being drained off over a period of preferably 15 seconds.

In the separator downstream of the third container, the sludge, the oil and the water are separated, with the oil being separated by an oil separator and the sludge being drawn off by a sludge trap on the bottom and passed to a sludge container. The sludge is also conveyed by the negative pressure generated by the water jet pump.

To purify the sludge, the latter is rinsed with purified water that can be taken from a receiving container disposed underneath an overflow of the second container. The water collected in the sludge container for purifying the sludge is in turn sucked by the negative pressure or vacuum into the automatically emptying third container.

To render the sand suitable for dumping, the sludge container is evacuated after water removal, while at the same time a heater can be switched on to heat the sludge to a temperature of 30°–40°C., thereby ensuring evaporation of the residual water. The sludge thus purified and dried can then be safely dumped. The sludge container is also evacuated by the negative pressure or vacuum generated by the water jet pump.

Alternatively, it is possible simply to dry the sludge container without further rinsing, by building up in the sludge container a negative pressure that can be generated by the water jet pump.

It is also possible to collect the sludge in a pre-filter stage disposed upstream of the third container. This pre-filter stage preferably comprises a cylindrical container in which an all-round filter is disposed coaxially thereto, through which filter flows waste water sucked from the inside to the outside by the negative pressure or vacuum generated by the water jet pump.

In the pre-filter stage, sludge retained by the filter is collected, and can be drained off through the bottom of the container. With this embodiment too, the sludge collected in the pre-filter stage can be dried by the generation of a negative pressure that in the connecting line between the waste water collecting container and the pre-filter stage is shut off.

The separator itself is preferably of multi-stage design, in which, as already mentioned, a first stage disposed preferably directly underneath the automatically emptying third container acts as the oil separator, and the stage upstream of the post-purification unit acts as a filter stage. To this end, the filter stage can contain a fine filter.

The various stages are subdivided by partitions either extending from the bottom part to end at a distance from the liquid level, or passing through the liquid level and ending at a distance from the bottom. As a result, sufficiently purified water flows from the last stage—the filter stage—and flows through the preferably biologically operating post-purification unit before flowing into the second container, in which the water jet pump is disposed.

By the teachings in accordance with the invention, standard sludge traps are no longer necessary. In already installed washing facilities, plastic containers can be fitted into the sludge traps, for example, to perform the function of the first container receiving the polluted water.

In an embodiment of the invention, part of the purified water can be degermed for subsequent supply to, for example, the sludge container, the separator or the post-purification stage. Also, part can be returned to the receiving container, from which in turn service water can be drawn, for example for cleaning motor vehicles.

Finally, the suction side of the jet pump can be connected to a line such as a hose, for example to permit evacuation of the washing boxes of washing installations.

Further details, advantages and features of the invention are clear from the following description of a preferred embodiment shown in the drawings.

Figure 2:
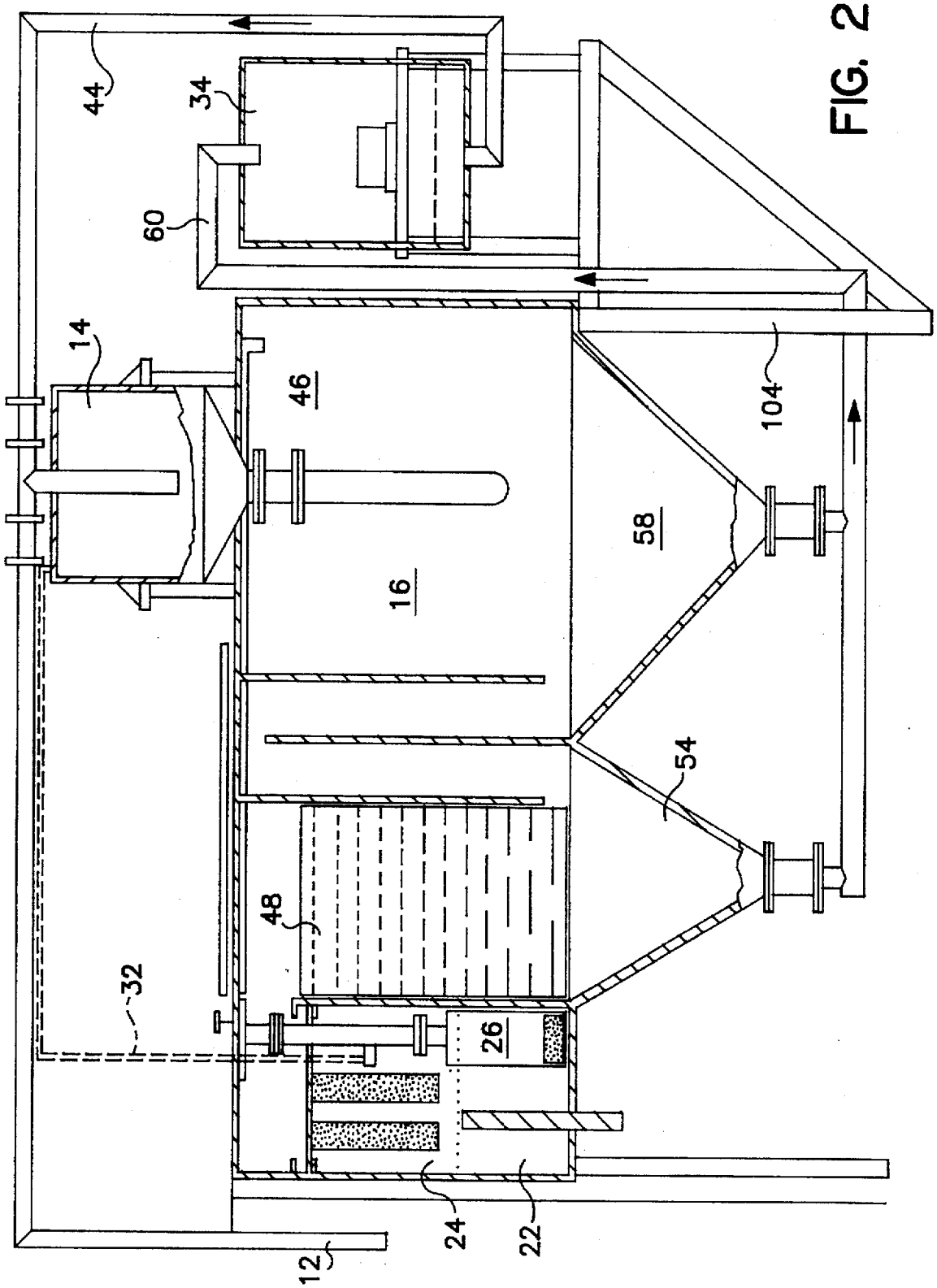
Figure 3:
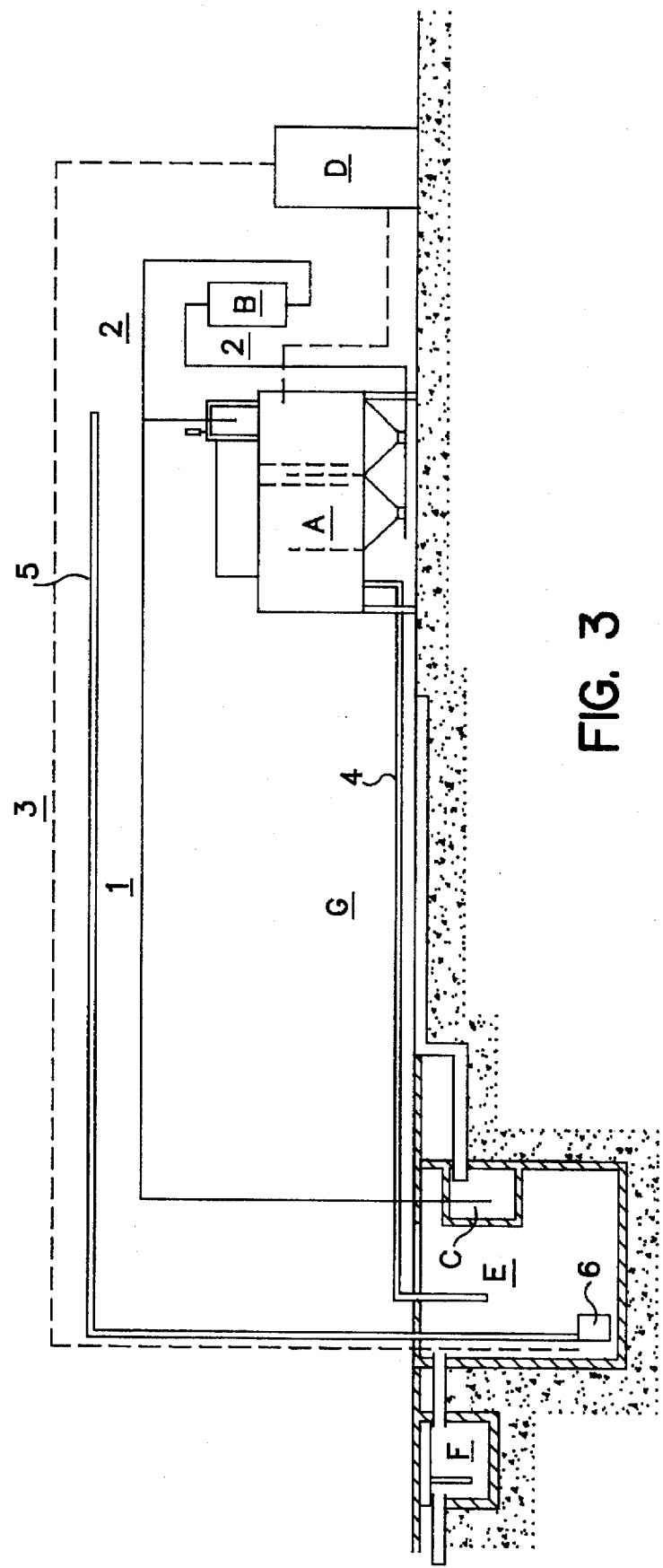
Figure 4:
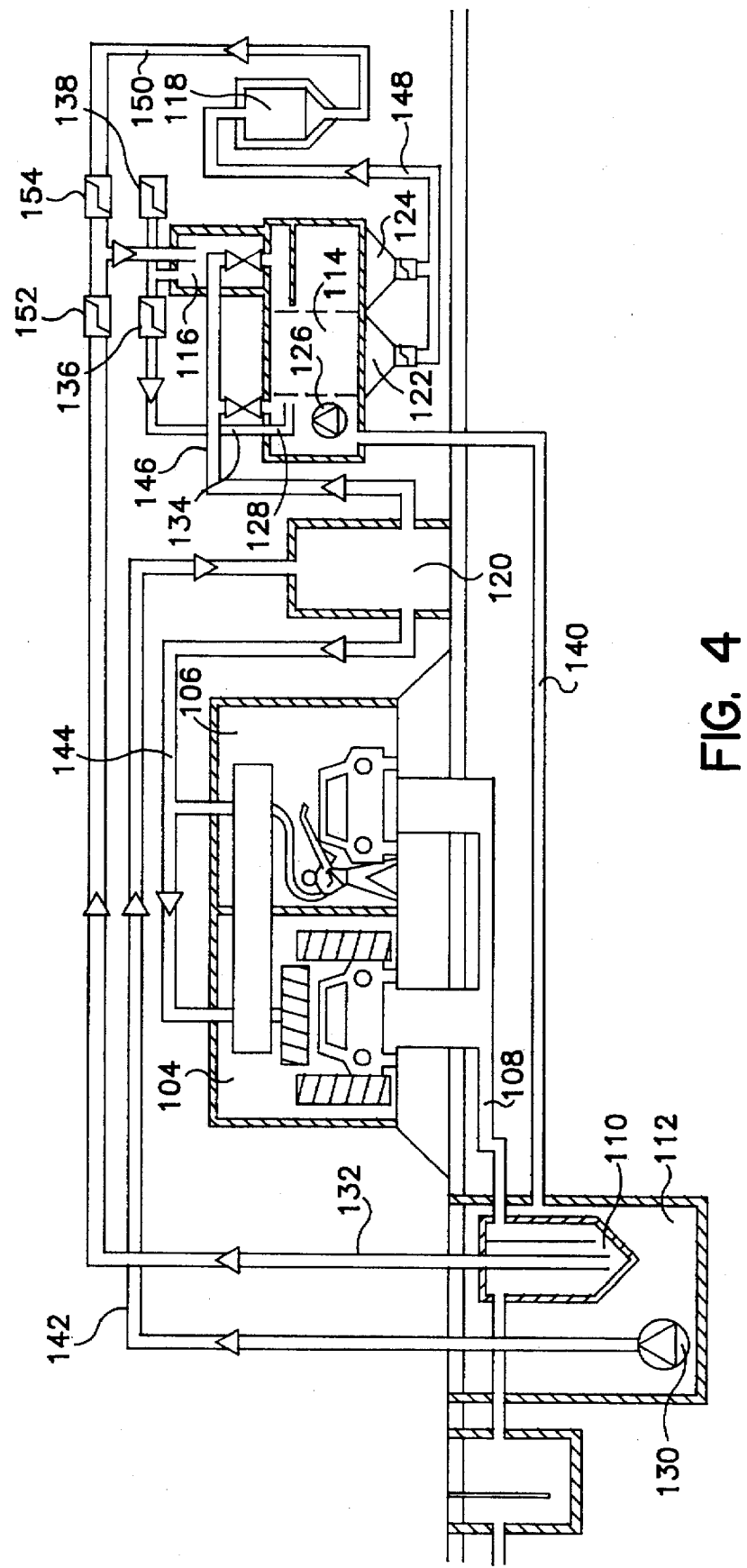
Figure 5:
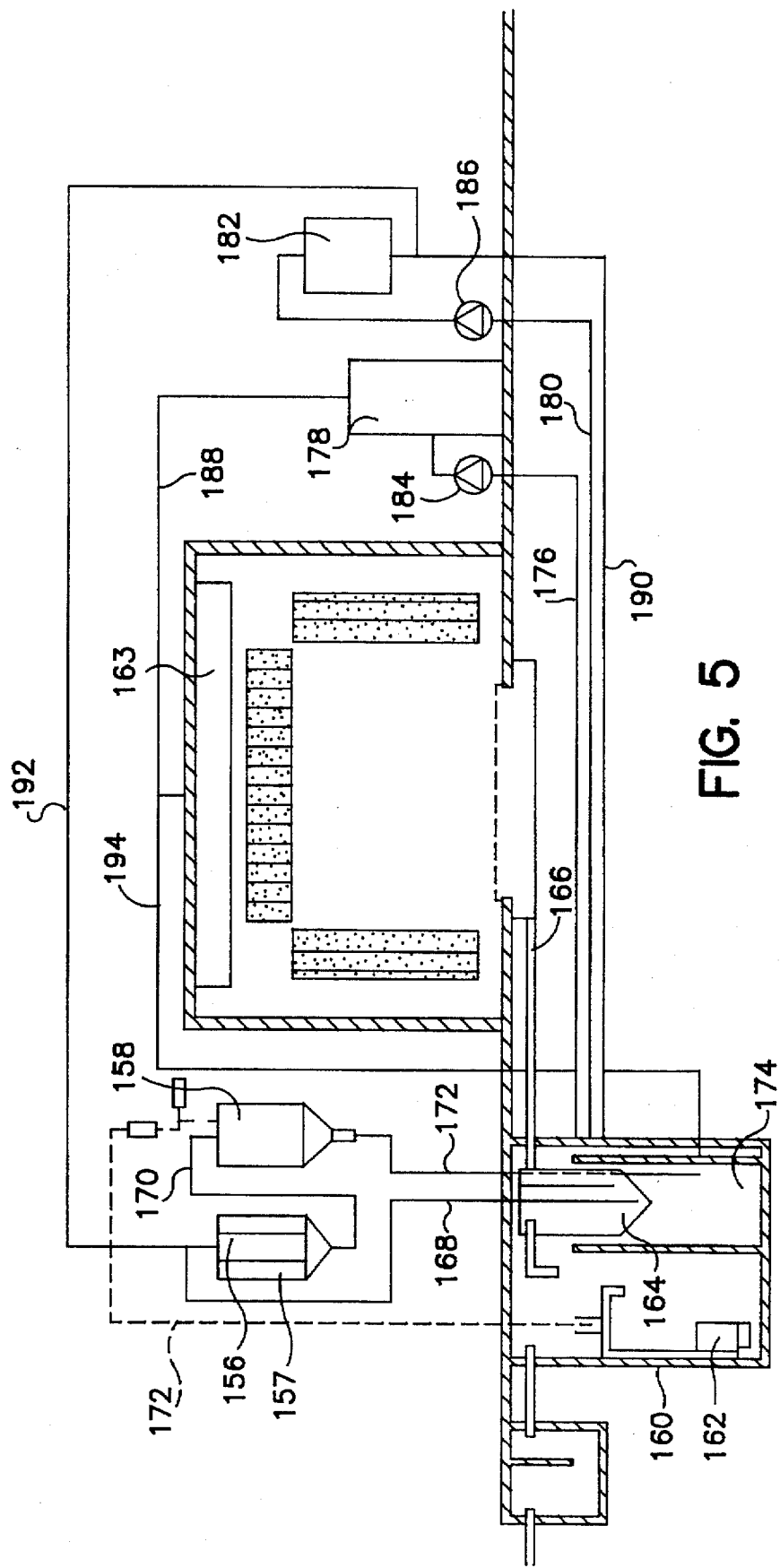

In the drawings,

FIG. 1 shows a principal illustration of a first embodiment of an array for purifying waste water, FIG. 2 shows a principal illustration of a second embodiment of an array for purifying waste water, FIG. 3 shows a function diagram, FIG. 4 shows a principal illustration of a third embodiment of an array for purifying waste water, and FIG. 5 shows a principle illustration of a fourth embodiment of an array for purifying waste water.

FIG. 1 shows purely an array for purifying waste water, in particular of waste water generated in car washing installations.

The system comprises a first container (10) collecting the waste water and communicating with a collecting container (14) via a line (12). Below the collecting container (14) is a separator (16) comprising several separator stages (46), (48), (50) and (52). The stage (16) disposed directly underneath the collecting container (14) acts as the oil separator and the last of the stages (48) as the fine filter stage.

Downstream of the separator (16) is a post-purification unit (24) such as a micro/fine filtration and/or degerming stage, that merges into a container (22) designated as the second container and receiving purified waste water. Inside the container (22) is a water jet pump (28) which conveys the water present in the container (22) by means of an immersion pump (26) inside the circuit.

The suction side (30) of the water jet pump (28) is connected by a line (32) to the collecting container (14). A line (36) branches off from the line (32) and opens into the upper part of sludge container (34).

An overflow pipe (38) extends from the container (22) collecting purified waste water and end in a clean water container (40) from which a line (42) leads to the bottom part of the sludge container (34).

Furthermore, a line (44) extends from the sludge container (34) and merges into the line (12) that in turn ends in the collecting container (14).

In order to fill the sludge container (34) with sludge, the separator (16) has sludge traps (54), (56) and (58) that end via a line (60) in the top part of the sludge container (34).

The operating sequence of the device in accordance with the invention is as follows: The waste water collected in the container (10) is sucked via the intake line (12) from the bottom part of the container (10) into the container (14). To do so, the container (14) is connected via line (32) to the suction side (30) of the water jet pump (22) and at the same time, a valve (62) provided in the line (12) and a valve (64) provided in the line (32) in front of the container (14) are opened. A line section (66) connecting the container (14) to the surrounding air is closed by a valve (68). Also closed are a valve (70) in the line (44) leading to the sludge container (34) and a valve (72) in the line (36) extending from the line (32) and leading to the sludge container (34).

Once the container (14) has filled to the required extent, it opens automatically, in accordance with teachings set forth in DE 30 32 503 C2. At the same time, the valve (64) is closed and the valve (68) opened.

The waste water flows via an outlet (line (74)) from the container (14) into the first stage (46) of the separator (16). The line (74) end above a perforated plate (82) beneath which is a sludge trap (58) sealed at the bottom by a valve (76) that can achieve a connection with the line (60). The first stage (46) is designed as an oil separator, i.e. that can collect oil from the surface of the water and drain it off via an overflow (78).

A partition wall (80) in the first stage (46) extends from the above water or oil level to a point at a distance from the bottom of the stage (46), i.e. from the perforated plate (82). Liquid can flow through this out of the stage (46) into the following stages (50), (52) and (48).

The stage (46) is separated from the stage (50) by a partition (84) having an aperture in the area of the water level. The stages (50) and (52) are subdivided by a partition wall (86) that ends at a distance from a perforated plate (88) covering the sludge trap (56) and that passes through the water surface. A corresponding partition (90) subdivides the stages (48) and (52), beneath which a perforated plate (92) covering the sludge trap (54) is likewise provided.

Like the sludge trap (58), the sludge traps (54) and (56) can each be sealed off by a valve (94) and (96) respectively from the line (60), via which sludge is then sucked into the sludge container (34) when no waste water is generated, i.e. when the washing installation is not in service. In this case, the valves (76), (94) and (96) are opened, valves (62), (64) and (70) are closed, and the valve (72) in the line (36) is opened.

Once the sludge container (34) has filled with sludge, the valves (76), (94) and (96) are closed. Valves (70) and (64) are also closed. Purified waste water can then be conveyed via the line (42) into the sludge container (34) from the bottom, either by an immersion pump (98) disposed in the receiving container (40) or via the lines (32) and (36) when the valve (72) is open, that extends from the suction side (30) of the water jet pump (22).

Once the water acting as wash water has reached the sludge container (34), whereby detergent, oil and the like are separated from the sludge, the now polluted wash water is drawn off via the line (44). To this end, the valves (62), (68) and (72) are closed and the valves (64) and (70) opened. The wash water therefore passes into the collecting container (14).

If the water is drawn from the receiving container (40) by means of the water jet pump (22), a further valve, not shown, is provided in the line (60) and is closed during suction out of the sludge container (34).

Once the water has been removed from the sludge container (34), evacuation takes place with the valves (64) and (70) closed and the valve (72) open, and at the same time a heater—not shown—is put into operation to dry the sand and evaporate the remaining water. The sludge then dried and purified can be disposed of without problem.

Part of the water can be supplied from the receiving container (40) to a degerming unit (100) from which in turn degermed water can be fed to the sludge container (34) and/or to the post-purification stage (24) and/or to the separator (16). Part of it can also be returned to the receiving container (40), particularly when service water is drawn from the receiving container (40). Finally, the suction side (30) of the water jet pump (28) can be connected via a line (102) to the washing boxes of a washing installation, for example.

FIG. 2 is an illustration of a system for water treatment following the teachings of the invention, in particular for waste water purification in car washing installations, that is very compact in design. Elements identical to those in FIG. 1 have been identically numbered. In order to provide a compact and easily used unit, the collecting container (14) and the sludge container (34) as well as the separator (16) comprising several separator stages are mounted on a frame (104).

Unlike the embodiment in FIG. 1, the line (44) drawing from the sludge container (34) does not extend from the top, but from the bottom of the container (34). However, the line (60) from the sludge or sand traps (54) and (56) still opens into the top part of the container (34).

A functional diagram of the process operating in accordance with the invention is shown in FIG. 3 where A=vacuum generator and gravity filter with oil separator,
B=sludge or sand filter with drier,
C=wash water collecting container,
D=water treatment unit such as ozone generator,
E=washing installation-side sludge trap,
F=oil separator,
G=washing installation-side wash water inlet.

In addition, (1) indicates the wash water intake line, (2) the sludge and sand discharge and (3) the units for water treatment, such as ozone treatment. Purified water coming from the separator (A) flows via a line (4) to the original sludge trap (E) that is preferably lined or provided with an insert. Water is supplied from the sludge trap to a washing installation, for example by an immersion pump (6), via a discharge line (5).

FIGS. 4 and 5 show purely preferred embodiments of arrays for the treatment of wash water. Waste water, for example from a gantry-type washing installation (104) or from washing boxes (106), is passed via a line (108) for the collection in a wash water collecting container (110) which in turn is disposed in a sludge trap (112), provided that an already installed washing facility is equipped in accordance with the invention. If not, the area (112) having the function of a service water stacking tank can also be provided by a separately installed tank or the like.

A further integral part of the process in accordance with the invention according to FIG. 4 is a pre-purification stage (114) connected to an automatically emptying collecting container (116), matching in function the collecting container in FIGS. 1 and 2. The pre-purification stage (114) can also match that in FIGS. 1 and 2. Furthermore, a sludge receiving container (118) and a fine-filtration unit (120) are provided that can also be replaced or supplemented by a degerming device such as an ozone stage.

The pre-purification stage (114) has several stages, not shown in detail, by which hydrocarbons, among others, are separated and the generated sludge is collected in so-called sludge traps (122), (124). The pre-purification stage also contains an immersion pump (126) supplying a water jet pump provided in the pre-purification stage (114) with the pre-purified waste water present in the pre-purification stage. In addition, an immersion pump (130) is provided in the service water stacking tank (112).

The operation of the process shown in FIG. 4 is as follows: The water collected in the wash water collecting container (110) via the line (108) is drawn via a line (132) into the collecting container (116) by a negative pressure generated by the water jet pump (128). To that end, the water jet pump (128) is connected via a line (134) to the collecting container (116). To draw the waste water via the line (132), the collecting container (116) is sealed at the bottom. At the same time, a valve (136) provided in the line (134) is opened.

As soon as the collecting container (116) has filled, it is automatically emptied. At the same time, infiltrated air can be sucked in via the line (134). To do so, the valve (136) is closed and the valve (138) opened, via which a connection is achieved between the collecting container (116) and the surrounding air.

The waste water flowing through the pre-purification stage then passes via a pipe (140) into the service water stacking tank (112). From here, the pre-purified water is conveyed by the immersion pump (130) via a line (142) to the fine filtration/degerming stage (120), to be supplied either via a line (144) to the gantry-type washing installation (104) or washing boxes (106), or via a line (146) to the pre-purification stage (114) or collecting container (116).

The sludge traps (122) are connected via a line (148) to the sludge receiving container (118), which in turn communicates via a line (150) with the collecting container (116), either to draw sludge out of the sludge traps (122) and (124) or, when the line (148) is blocked, to dry the sludge that has collected in the sludge receiving container (118). If a negative pressure is to be generated in the sludge receiving container (118) via the line (150), the valve (136) in the line (134) must, of course, be open and the valve (152) in the line (132) and the valve (138) closed, whereas a valve (154) present in the line (150) is opened.

The process according to FIG. 5 differs from that in FIG. 4 in that, among other things, a pre-purification stage (156) is not downstream, but upstream of a collecting container (158). Regardless of that, however, the negative pressure generated by a water jet pump (160) that is operated by an immersion pump (162) is used to draw off the wash water collected in a wash water collecting container (164) and then to supply it the required quantity to purification stages.

In this way, the waste water coming from a gantry-type washing installation (163) is supplied via a line (166) to the wash water collecting container (164), and passes via a line (168) into the pre-purification stage (156) and then via a line (170) to the automatically emptying collecting container (158). For this purpose, the collecting container (158) is connected via a line (172) to the negative pressure side of the water jet pump (160).

The pre-purification stage (156) has an all-round cylindrical filter (157), preferably disposed coaxially in the container, through which filter is sucked the waste water flowing via the line (168), so that dirt, sand or other sludge remains inside, while the pre-purified waste water is drawn via the line (170) to the container (158).

From the container (158), the function of which is the same as that of the collecting container (116) in FIG. 4 and the collecting container (14) in FIG. 1, the pre-purified waste water flows via a line (172) into a stacking tank (174) in which the wash water collecting container (164) is also disposed.

From the stacking tank (174), the pre-purified water can flow via a line (176) to a fine filtration stage (178) or via a line (180) to another degerming unit such as an ozone generator (182). To this end, pumps (184) and (186) are disposed in the lines (176) and (180).

From the fine filtration stage (178), the purified water can flow as service water via the line (188) to the washing installation. From the degerming unit (182), water can either be supplied to the stacking tank (174) via a line (190) or to the pre-purification stage (156) via a line (192).

If the water in the stacking tank (174) is sufficiently germ-free, this applies in particular when water has been returned via the line (190) from the degerming unit (182) into the stacking tank (174), the gantry-type washing installation (163) can be directly supplied with service water via line (194).

We claim:

1. A process for purifying waste water from a vehicle washing installation comprising collecting said waste water, the water containing oil, in the first container, passing the collected waste water from the first container to a third container by negative pressure generated by a water jet pump having a water seal of purified waste water, automatically emptying water from the third container into a second container, directly or indirectly, when a predetermined amount of waste water is reached in the third container, said waste water being passed through a separator for purification, a portion of the water purified in said separator being provided for said water seal either before it enters the third container or between the third and second container, and returning the waste water from the second container to the vehicle washing installation for reuse.

2. A process according to claim 1, wherein solids are separated from said waste water and are drawn off by the negative pressure generated by said water jet pump (28, 128, 160).

3. A system according to claim 1, wherein
a purification stage (16, 114, 156) is upstream of said second or third container (22, 112, 158).

4. A process according to claim 1 wherein said separator (16, 114) is of multi-stage design, with a first stage (46) being an oil separator and a further stage (48) being filter stage.

5. A process according to claim 1 using a system wherein
said separator (16,114) has at least one sludge trap (54, 56,58,122,124) that is connected via a closable fourth line (60,148) to a sludge container (34,118).

6. A process according to claim 5, using a system wherein said sludge container (34, 118) is evacuatable and has a heater.

7. A process according to claim 5, using a system wherein a line leading to a degerming unit (100, 120, 182) communicates with said second container (112, 114) and said degerming unit is connected via a line to said sludge container (34, 182).

8. A process according to claim 1, using a system wherein a service water line (144, 188) leading to the vehicle washing installation extends directly or indirectly from said second container (112,174).

9. A process according to claim 1, wherein
a pre-filter container (156) is upstream of said third container (158).

10. A system according to claim 9, wherein said pre-filter container (156) has an all-round filter (157) disposed or not disposed concentrically to the container.

11. A process according to claim 10, wherein waste water is drawn by said water jet pump into said third container (158) via an internal area surrounding said filter (157) and the area between the prefilter container wall and the exterior of the filter.

12. A process according to claim 1, wherein the purified water is collected in the second container (22, 112, 174) and is degermed.

13. A process according to claim 1, wherein the waste water, before returning to the washing installation for reuse, is subjected to at least one of a microfine filtration process or degerming process.

* * * * *